US010425293B2

(12) United States Patent
AuYoung et al.

(10) Patent No.: US 10,425,293 B2
(45) Date of Patent: Sep. 24, 2019

(54) NETWORK RESOURCE ALLOCATION PROPOSALS

(71) Applicant: Hewlett Packard Enterprise Development LP, Houston, TX (US)

(72) Inventors: Alvin AuYoung, San Jose, CA (US); Yadi Ma, Palo Alto, CA (US); Sujata Banerjee, Palo Alto, CA (US); Junggun Lee, Mountain View, CA (US); Puneet Sharma, Palo Alto, CA (US); Yoshio Turner, San Francisco, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 249 days.

(21) Appl. No.: 15/327,021

(22) PCT Filed: Jul. 30, 2014

(86) PCT No.: PCT/US2014/048959
§ 371 (c)(1),
(2) Date: Jan. 17, 2017

(87) PCT Pub. No.: WO2016/018321
PCT Pub. Date: Feb. 4, 2016

(65) Prior Publication Data
US 2017/0163493 A1 Jun. 8, 2017

(51) Int. Cl.
*H04L 12/24* (2006.01)
*H04L 12/64* (2006.01)
(Continued)

(52) U.S. Cl.
CPC .......... *H04L 41/30* (2013.01); *H04L 12/6418* (2013.01); *H04L 41/12* (2013.01); *H04L 47/783* (2013.01); *H04L 47/805* (2013.01)

(58) Field of Classification Search
CPC ..... H04L 41/30; H04L 47/805; H04L 47/783; H04L 41/12; H04L 12/6418
(Continued)

(56) References Cited

U.S. PATENT DOCUMENTS 10,009,285 B2 * 6/2018 Mogul ..................... G06F 9/50
2009/0163222 A1 6/2009 Schaepperle et al.
(Continued)

FOREIGN PATENT DOCUMENTS

CN 10-3051565 A 4/2013
CN 10-3346904 A 10/2013

OTHER PUBLICATIONS

"Multi-Agent Tasks Scheduling System in Software Defined Networks", Nov. 28, 2013.
(Continued)

*Primary Examiner* — Chris Parry
*Assistant Examiner* — Weiwei Y Stiltner
(74) *Attorney, Agent, or Firm* — Hewlett Packard Enterprise Patent Department

(57) ABSTRACT

Example implementations disclosed herein can be used to allocate network resources in a software defined network (SDN). In one example implementation, a method can include receiving a plurality of resource allocation proposals from a plurality of controller modules, instructing the controller modules to generate votes for the plurality of resource allocation proposals, and selecting one of the plurality of resource allocation proposals based on the votes to instantiate the selected resource allocation proposal in the SDN.

15 Claims, 8 Drawing Sheets

(51) Int. Cl.
*H04L 12/911* (2013.01)
*H04L 12/927* (2013.01)

(58) Field of Classification Search
USPC .......................................................... 709/226
See application file for complete search history.

(56) References Cited

U.S. PATENT DOCUMENTS

| | | | |
|---|---|---|---|
| 2013/0080559 A1* | 3/2013 | Rao | H04L 67/1097 709/208 |
| 2013/0124712 A1 | 5/2013 | Parker | |
| 2013/0266007 A1 | 10/2013 | Kumbhare et al. | |
| 2014/0052877 A1 | 2/2014 | Mao | |
| 2014/0192645 A1 | 7/2014 | Zhang et al. | |
| 2014/0192646 A1 | 7/2014 | Mir et al. | |

OTHER PUBLICATIONS

"SDN Architecture Overview" Dec. 1, 2013.
"To the Land of Plenty . . . Moving Towards High-performance Cluster Management", Mar. 25, 2014.
Alvin Auyoung et al, "Corybantic: Towards the Modular Composition of SDN Control Programs", Sep. 6, 2013.

\* cited by examiner

NETWORK RESOURCE ALLOCATION PROPOSALS

BACKGROUND

Software-defined networking (SDN) is a technique for implementing computer networking environments using software to control dynamically the configuration and allocation of networking and computing hardware resources in the network, In such networks, the control plane can be abstracted as a controller application that has a global view of the network state and manages flow of data and the assignment of computing resources. For example, a controller application can use various network control protocols, such as OpenFlow, to manage the flow of network packets in SDN compatible switches and the allocation of computing resources. In an SDN, the controller may be instantiated in any computer system in the network with connectivity to the network devices and other end-points, such as servers and end-clients.

DETAILED DESCRIPTION

Figure 1:
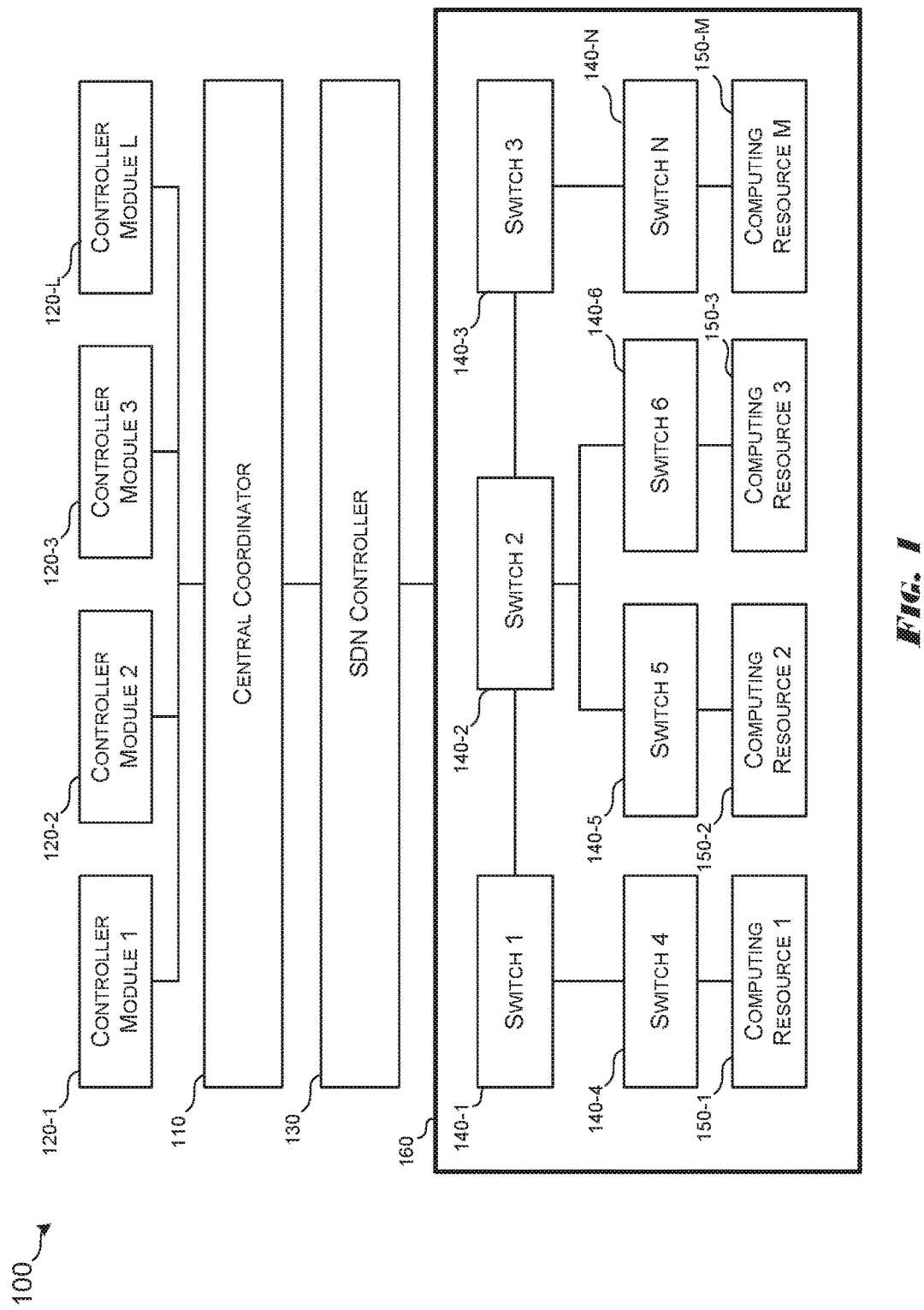
FIG. 1 is a schematic diagram of a software defined network (SDN) according to various examples.

Software defined networks (SDN) provide network operators with the ability to configure networking and computing resources flexibly and dynamically. In some implementations, the specific configuration of a network topology can be controlled by modular controller modules provided by independent developers and installed in one or more of the computer systems in the network. Each controller module can act independently to issue commands to an SDN controller to control the allocation of resources in the network. The modular and independent nature of the manner in which controller modules propose specific resource allocation affords SDN networks the ability to readily change the allocation of resources to achieve particular goals without the need to reprogram the SDN controller. A network operator can install a controller module in the SDN network to achieve a particular resource allocation associated with the policies, priorities, or objectives of that particular controller module.

For example, the goal of one controller module (e.g., a Fault-Tolerance Module (FTM)) may be to allocate the network resources to mitigate the effects of any potential hardware failures, while the goal of another controller module (e.g. a Power Control Module (PCM)) may be to reduce overall power consumption. Such controller modules like the FTM attempt to maximize the average service availability of its tenants' virtual machine (VM) instances by minimizing the impact of any single rack or server failure on the VM instances. Each controller module may implement a different comparison mechanism, model, metric or approach for evaluating network states and resource allocation proposals. In some implementations, an FTM can use a metric called "worst-case survivability" (WCS) for comparing different network states and resource allocations proposals. A comparison of the output of the WCS operator returns a preference for the network state with the higher WCS, or a "no preference" if the WCS for each state is identical.

Another example controller module type is a so-called Core-Bandwidth Module (CBM). Such modules try to conserve link bandwidth in the core of the network. Its comparison method might prefer resource allocation proposals that represent network states that use less core bandwidth. When generating a resource allocation proposal, a CBM may try to place VMs in the same physical rack or aggregation switch to avoid using core bandwidth.

Yet another controller module type is a Guaranteed-Bandwidth Module (GBM). A GBM is a more sophisticated controller module and may attempt to reserve inter-VM network bandwidth for each tenant's set of VMs. Accordingly, the goal of a GBM may include placing as many tenant requests as possible for VM clusters with bandwidth guarantees. Thus, GBM tends to prefer network resource allocations that are likely to fit more such requests by consuming less network bandwidth. When generating a resource allocation proposal, a GBM may place each request in the smallest or lowest network subtree.

In some implementations, a network operator may elect to install multiple controller modules to afford the aforementioned flexibility in network resources allocation. In systems in which multiple controller modules are installed, there can be conflicts between the network states and resource allocations preferred by different controller modules. These conflicts between the goals of multiple controller modules can be resolved by vote based or election type decisions as to which of the available resource allocation proposals will ultimately be implemented. The differences between resource allocation proposals represent how each of the plurality of controller modules can compete for resources (e.g., network devices, bandwidth, computing time, etc.) That is, two or more SDN controllers and/or two or more controller module applications on a single SDN controller can compete for one or more finite resources (e.g., link bandwidth, switch table slots, the placement of a flow or virtual machine in a physical topology).

Systems and methods for resolving conflicts between disparate controller module goals and selecting a particular resource allocation proposal that is determined to be the most preferred by the controller modules are described herein below.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

FIG. 1 illustrates a system 100 for controlling a software-defined network (SDN) 160, in accordance with various examples. The system 100 can include multiple controller modules 120, a central coordinator 110, and an SDN controller 130, each of which can be part of or coupled to an SDN network 160. As shown, SDN network 160 can include multiple switches 140 and computing resources 150 connected to and in electronic communication with one another using various electronic communication media and protocols. As used herein, the term "switch" refers to any networking hardware that can be used to route data from one point to another. Each computing resource 150 can include any type of function specific or general purpose computing hardware, Accordingly, as used herein, the term "computing resource" can refer to any computing device, such as a server computer, capable of instantiating applications, virtual machines (VMs), and other executable code.

As shown, the topology of the SDN network 160 can include N switches 140 and M computing resources, where N and M are natural numbers. The specific configuration and allocation of resources in the SDN network 160 can be controlled by the SDN controller 130 according to a specific resource allocation proposal. Various examples of the present disclosure include techniques for selecting a particular resource allocation proposal that satisfies the objectives or goals of at least some of the controller modules 120 to some degree. In one example, the central coordinator 110 can select a particular resource allocation proposal based on controller modules votes polled from all of, or some portion of, the controller modules 120. The votes can be expressed as ordinal preferences or cardinal values for specific resource allocation proposals over other specific resource allocation proposals.

In various example implementations, the multiple controller modules 120, central coordinator 110, and SON controller 130 can be implemented as any combination of software, firmware, and hardware in a single or in multiple physical or virtual computer systems. In some examples, the software or firmware can be implemented as computer executable instructions stored on a non-transitory computer readable medium. Various examples of the present disclosure can be implemented or instantiated in one or more computer systems by executing the computer executable instructions in one or more computer processors. For example, the controller modules 120, the central coordinator 110, and the SON controller 130 can be instantiated in any of the computing resources 150 or in another computer system (not shown) coupled to the SON network 160.

Each of the controller modules 120 can be designed and implemented with a particular objective in mind and may be used alone or in combination with other controller modules 120. In one example implementation, each controller module 120 can include functionality to control aspects (e.g., bandwidth, data flow latency, data flow level, routing features, virtual machine allocation, etc.) of the SON network. In some examples, the controller modules 120 can control aspects of the entire SDN network 160 (e.g., physical network, virtual network, combination of physical and virtual network, etc.). In other examples, controller modules 120 can control a particular aspect of a portion of the network (e.g., partial network, specific area of the network, etc.).

The controller modules 120 can be associated with or identified with specific goals or characteristics. For example, the controller modules 120 can include a bandwidth allocation type controller module to generate resource allocation proposals, that when instantiated in the SON network 160, allocates guaranteed bandwidth to a set of endpoints. The controller modules 120 may also include a data flow latency type controller module to generate resource allocation proposals that support end-to-end latency bounds for data flows or data flow classes. Similarly, the controller modules 120 can include a data flow-level traffic engineering controller module to generate resource allocation proposals that re-route flows to achieve an objective, such as load balancing. In some other examples, the controller modules 120 can include a VM-migrator to generate resource allocation proposals that result in VMs between being migrated from one computing resource 150 to another, e.g., for consolidation or fault mitigation or reduced power consumption. In some examples, the controller modules 120 can include a power control management type controller module to generate resource allocation proposals that reduce energy costs by attempting to turn off under-utilized network resources, such as any unused switches 140 and computing resources 150.

As described above, controller modules 120 can generate resource allocation proposals that define resource allocations in the SDN network 160 that the SDN controller 130 can use to configure or allocate resources in the SDN network 160. In one example, the resource allocation proposals can include detailed specifications for any or all configuration settings in the SDN network to allocate the network resources. In other examples, resource allocation proposals can include specifications that represent changes to a current allocation state and may include time periods during which the changes should be in effect. Accordingly, such resource allocation proposals can include indications of changes or differences between a current configuration of the network 160 and designation of the times during which the changes should be applied. The indications of changes can be expressed as differences relative to a default or initial resource allocation. As such, the resource allocation proposals can be expressed in either absolute or relative terms.

In various example implementations, resource allocation proposals can be used by the SDN controller 130 to configure the SDN network 160 and/or the system 100, In some examples, when the SON controller 130 configures the SON network 160 in accordance with a particular resource allocation proposal, it is said to result in a change to the configuration of the topology of the SDN network. Changes to the configuration of the topology of the SDN network 160 can include activation or deactivation of servers, switches, or links, addition of a switch table entry, or placement and migration of VMs. Further, the allocation of network resources can include specifications for fractions of a link's bandwidth, a rate limiter or switch port, an entire line card, an internet group management protocol table entry, a virtual local area network tag, a queue and/or an OpenFlow table entry, and the like.

In some examples, controller modules 120 can generate proposals in response to new inputs (e.g. a customer request for bandwidth), changes in network resource allocation states (e.g., no more reservations for line-card), or periodic timers (e.g., load balancing across link technologies).

Because controller modules 120 can have specific goals and objectives, individual controller modules 120 may have corresponding controller specific sets of policies and objectives. In some examples, controller module policies can express constraints on what configurations and settings should be allowed in the SDN network 160, and objectives can express the costs and benefits of specific resource allocation proposals generated by the corresponding controller modules 120. In some scenarios, a configuration of a topology expressed as a resource allocation proposal by one controller module 120 may violate the policies and objectives of another controller module 120.

To resolve or mitigate the conflicts between resource allocation proposals generated by various controller modules 120, the central coordinator 110 can include functionality that can select which of multiple allocation resource proposals are preferred by the controller modules 120 as a group. In one example, the functionality for selecting the winning resource allocation proposal of the central coordinator 110 can include collecting votes that indicate the ranking of the individual controller modules 120 for certain resource allocation proposals over other resource allocation proposals.

Figure 2:
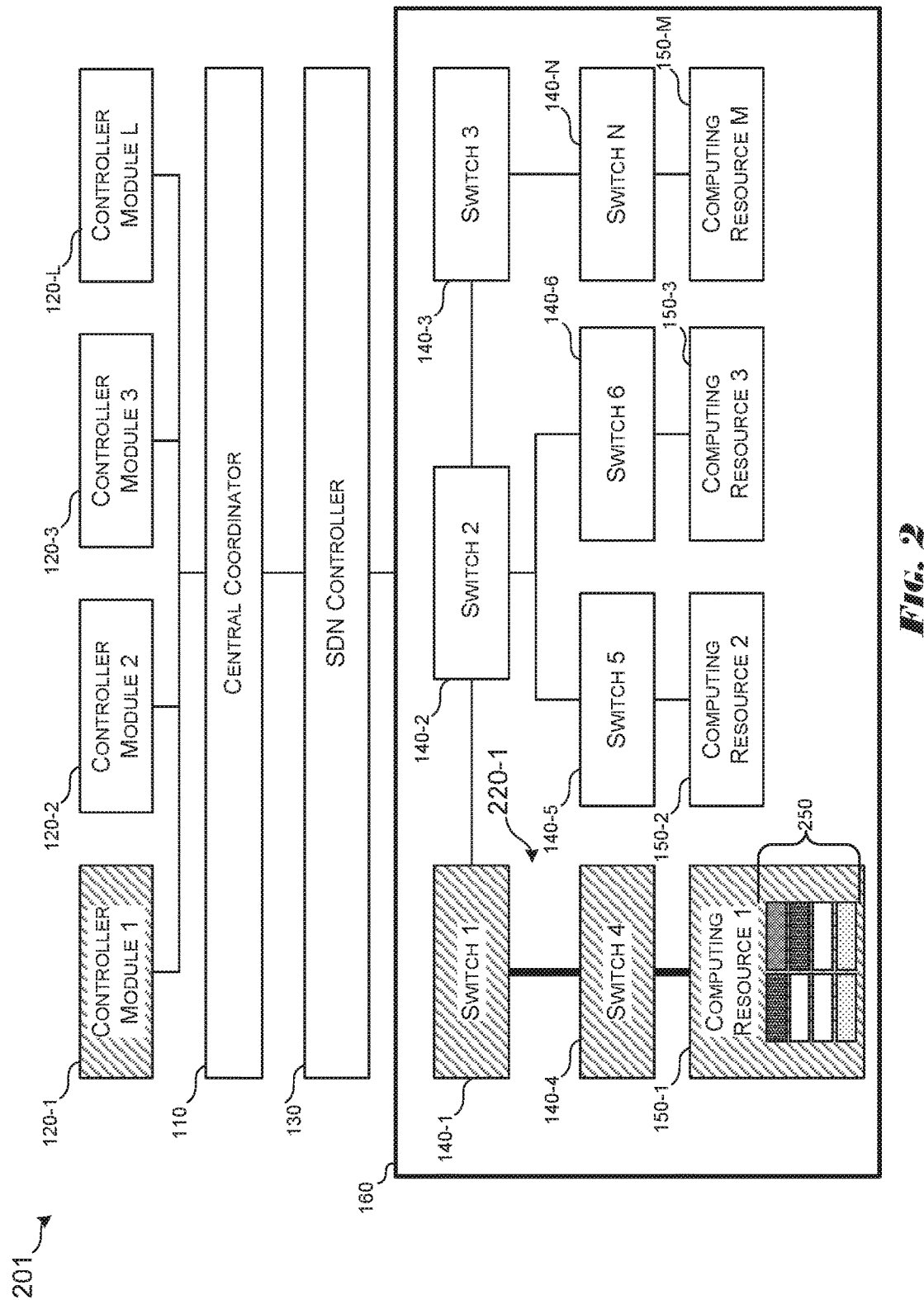
FIG. 2 illustrates one example of a network state in an SDN according to a particular resource allocation proposal.
Figure 3:
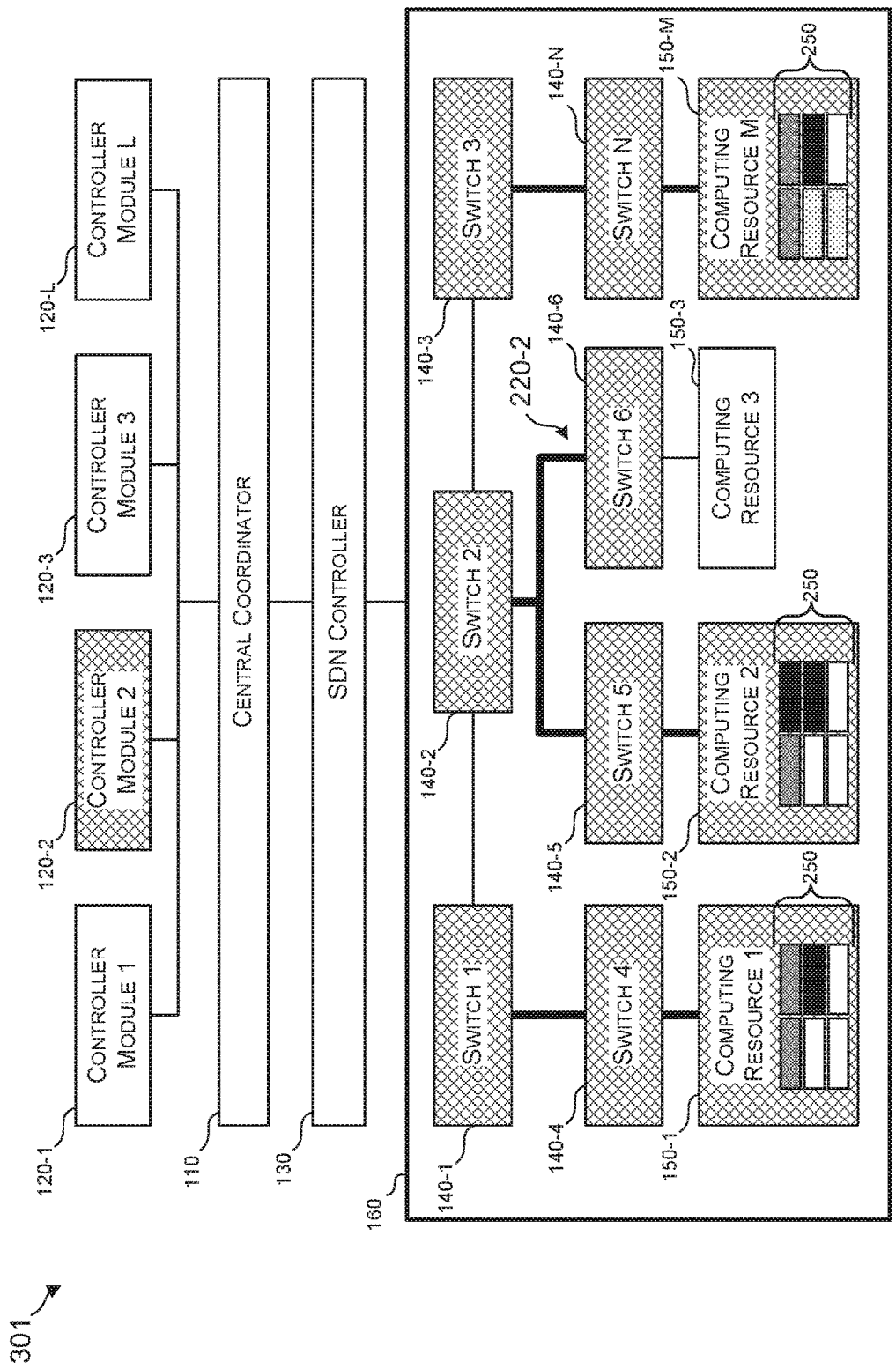
FIG. 3 illustrates another example of a network state in an SDN according to another particular resource allocation proposal.
Figure 4:
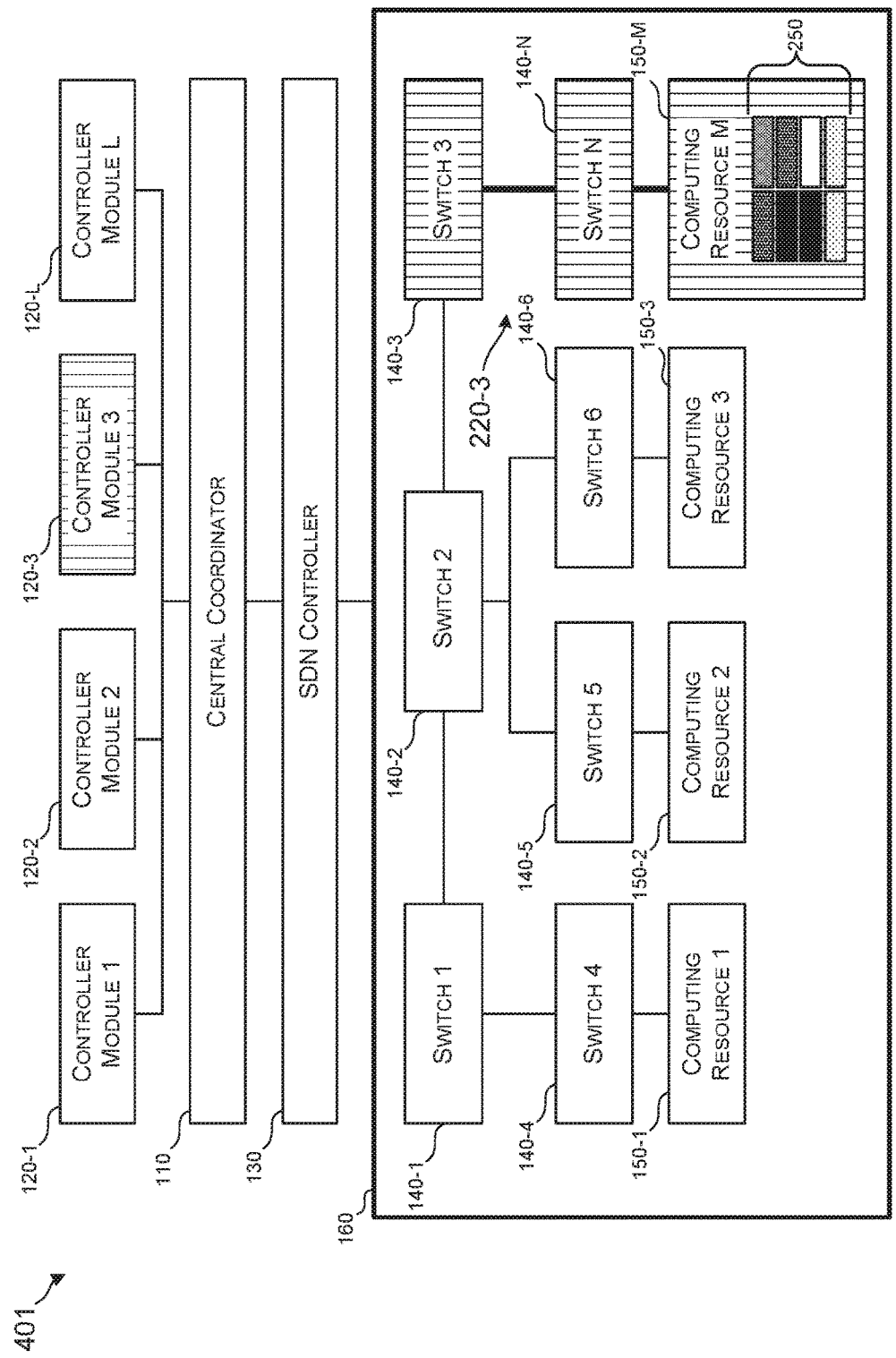
FIG. 4 illustrates yet another example of a network state in an SDN according to another particular resource allocation proposal.

FIGS. 2-4 illustrate configurations of topologies 220 in the SDN network 160 resulting from resource allocation proposals that have conflicting or inconsistent policies or objectives. FIG. 2 illustrates configuration 201 of system 100 with example network state 220-1 of the SDN network 160 resulting from the instantiation of a resource allocation proposal generated by controller module 120-1. As shown, network state 220-1 includes activating switch 140-1 and switch 140-4, instantiating and assigning specific virtual machines 250 for specific functionality, and activating the corresponding links between the switches 140-1 and 140-4 and computing resources 150-1. Because of the relative low utilization of the available network resources, the network state 220-1 may represent policies and objectives concerned with reducing the overall power or cost of operation for the SDN network 160. The power and cost savings are achieved by deactivating switches 140-2, 140-3, 140-5, 140-6, and 140-N as well as computing resources 150-2 through 150-M.

In contrast, FIG. 3 illustrates a configuration 301 system 100 with example network state 220-2 of the SDN network 160 resulting from the instantiation of a resource allocation proposal generated by controller module 120-2. As illustrated, the network state 220-2 includes many more of the switches 140 and computing resources 150 being utilized as compared to network state 220-1 depicted in FIG. 2. Accordingly, the network state 220-2 may be the result of a particular resource allocation proposal representing the policies and objectives of the controller module 120-2 concerned with maintaining a minimum level of bandwidth and potential links between the various computing resources 150 and virtual machines 250 in the SDN network 160. The policies and objectives represented by such a resource allocation proposal may place little value on power savings.

FIG. 4 illustrates configuration 401 of system 100 having an example network state 220-3 of the SDN network 160 resulting from the instantiation of the corresponding resource allocation proposal generated by controller module 120-3. The network state 220-3, like topology 220-1, activates a limited number of switches 140 and computing resources 150 to instantiate some number of virtual machines 250. Specifically, network state 220-3 includes activation of switch 140-3 and switch 140-N and instantiation of the virtual machines 250 in the computing resource 150-M. While network states 220-1 and 220-3 include activation of the same number of similar components of the SON network 160, it is possible that the activations of the specific switches 140-N and computing resources 150-M in the topologies help achieve the policies and objectives of the originating controller modules 120-1 and 120-3. For example, there may be power savings in using switches 140-1 and 140-4 and computing resource 150-1 because those specific devices are more energy efficient than switches 140-3 and 140-N in computing resource 150-M. Similarly, there may be performance enhancements achieved by using switches 140-3 and 140-N and computing resource 150-M because those specific devices, while not inexpensive to operate, may be faster or otherwise have higher performance than the other components of the SON network 160.

As illustrated by the example network states 220 in FIGS. 2-4, the policy and objectives of the various controller modules 120 as expressed by corresponding resource allocation proposals and represented in the resulting network states 220 can often conflict with one another. To select a winning resource allocation proposal, the central coordinator 110 can instruct each controller module 120 to vote for at least one of all of the submitted resource allocation proposals. The central coordinator 110 can then analyze the vote to select the resource allocation proposal that would result in the most preferred network state.

Figure 5:
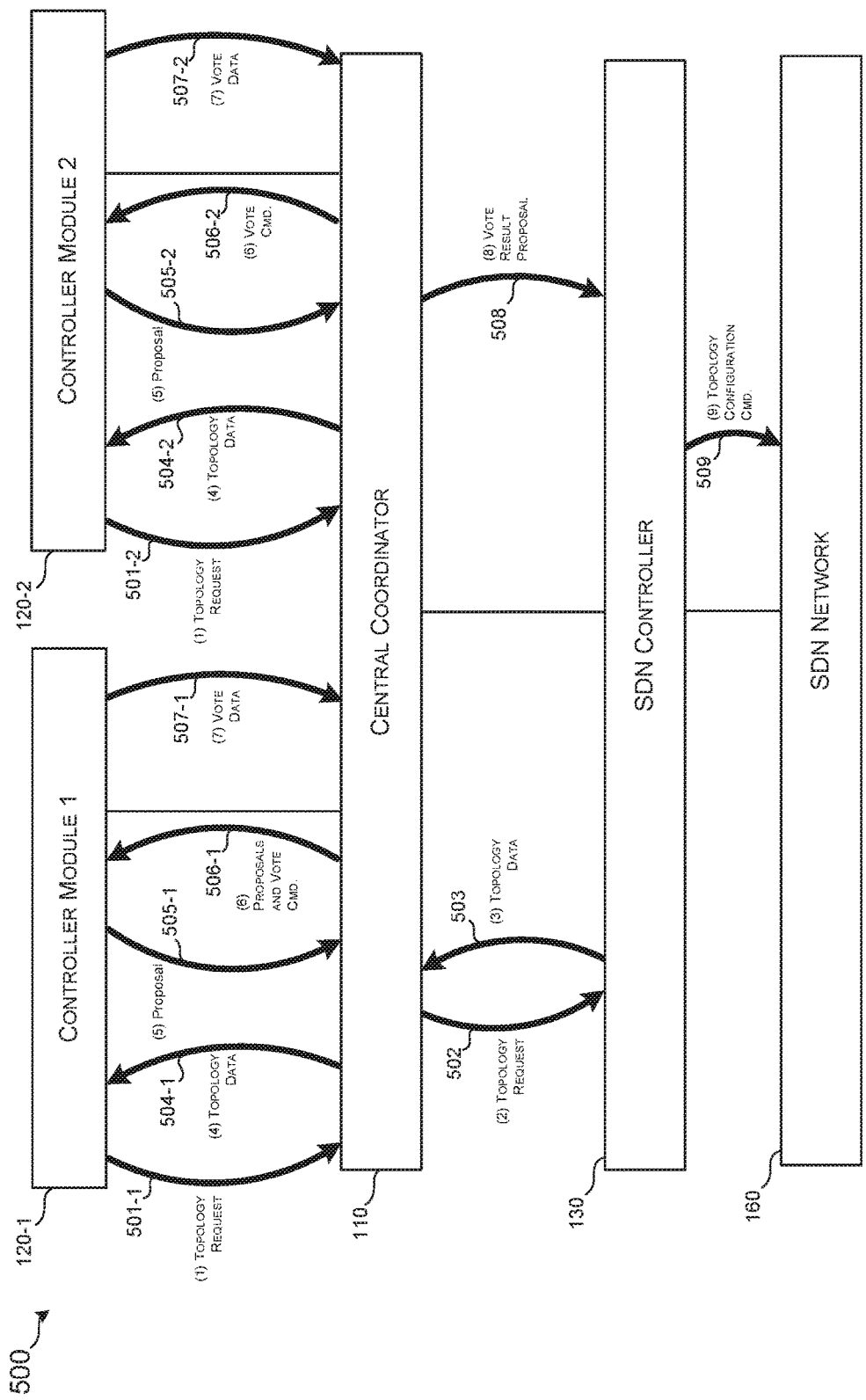
FIG. 5 illustrates a dataflow for selecting a resource allocation proposal from multiple resource allocation proposals based on independent controller module votes, according to various examples.

FIG. 5 illustrates the data flow 500 among the controller modules 120, the central coordinator 110, the SON controller 130, and the SON network 160 for selecting a winning resource allocation proposal, according to various examples of the present disclosure. In such examples, the central coordinator 110 can be connected to multiple controller modules 120. For the sake of clarity, only two controller modules 120-1 and 120-2 are shown, however, the example illustrated in FIG. 5 can be scaled to include any number of controller modules 120. In such examples, the controller modules 120 can access the central coordinator 110 and the SON controller 130 through an application programming interface (API). The API can be provided by the central coordinator 110 or the SDN controller 130. In some examples, the API can include a listing of specific function calls and/or message syntaxes that the controller modules 120 can use to communicate with the central coordinator 110.

In various implementations, the API provided by the central coordinator 110 may allow developers of controller modules 120 to implement some or all of the specifications in the API. For example, the API may require the controller modules 120 to generate resource allocation proposals that define network states that allocate resources according to the needs of a user (e.g., a tenant requesting a set of VMs) and satisfy the modules' policies and objectives (e.g., meet high availability goals by appropriately placing VMs).

Resource allocation proposals may be defined as changes to the current network state, such as creating a VM or cluster, moving an existing VM, making a bandwidth reservation, powering a switch on-off or otherwise modifying a state (switch links, switch table entries). Similarly, controller modules 120 may be required to include functionalities to evaluate proposals from other modules. For this functionality, the controller module developer may have a choice between implementing a simple coarse-grained comparison (ordinal ranking), or a more fine-grained rating evaluation (cardinal ranking). The comparisons may take two arbitrary resource allocation proposals as input, and express a preference for one of the states represented by the proposal, or indifference between the two. The more fine-grained evaluation methods can return a numerical value for a given resource allocation proposal. A controller module 120 need only include functionality to execute one of these methods. In some examples described herein, if a controller module 120 is implemented using an evaluation method, the central coordinator 110 can infer corresponding comparison results.

At any time, any one of the controller modules 120 can generate and send a topology request message 501 (reference 1) to the central coordinator 110. While this particular action is shown as being at the beginning of the data flow 500, topology request messages 501 can be initiated by any controller module 120 whenever necessary. For example, a controller module 120 may initiate a topology request message 501 on a periodic basis or in response to input from the central coordinator 110 or another controller module 120 to updat its information regarding the topology of the SDN network 160.

In response to the topology requests 501 received from the controller modules 120, the central coordinator 110 can generate and send its own topology request 502 (reference 2) to the SDN controller 130. In response to the topology requests 502 received from the central coordinator 110, the SDN controller 130 can access previously determined information regarding the current topology of the SDN network 160. In another example, the SDN controller 130 can analyze the SDN network 160 to determine its current topology. The SDN controller 130 can then generate a topology data message 503 (reference 3) that includes the information about the current network state of the SDN network 160. As used herein, the information about the current network state can include information including, but not limited to, the activation state of switches 140, the availability of specific links, and the allocation of computing resources 150.

Based on the topology data message 503, the central coordinator 110 can generate and send topology data messages 504 (reference 4) to any and all of the currently connected controller modules 120. The topology data messages 504 can be generated and formatted according to the API.

Based on the topology data messages 504, the central modules 120 can generate resource allocation proposals in accordance with corresponding policies and objectives. Each one of the controller modules 120 may generate resource allocation proposals based on its own internal objectives, routine or analysis. The controller modules 120 can then generate and send resource allocation proposals 505 (reference 5) in accordance with the API to the central coordinator 110.

When the central coordinator 110 receives one or more new resource allocation proposals from one or more corresponding controller modules 120, it can perform a qualification routine on the resource allocation proposals to verify compliance with the API and/or other requirements or policies of the SDN network 160. The central coordinator 110 can send some or all of the resource allocation proposals 506 (reference 6) to the controller modules 120. In one example, the central coordinator 110 can include a vote command along with the resource allocation proposals 506 to instruct the controller modules 120 to evaluate all of the resource allocation proposals 506 according to their own internal policies and objectives. Accordingly, each controller module 120 can evaluate the resource allocation proposals 506 according to their own analysis independent of the analysis of the other controller modules 120.

Based on independent analysis, the controller modules 120 can generate and send vote data 507 (reference 7) to the central coordinator 110 it in accordance with the API. The vote data 507 can include indications of each controller module's 120 preference for one resource allocation proposal over another.

While the analysis that each controller module 120 performs to evaluate, and ultimately vote on, the resource allocation proposals may be unique to that controller module 120, the style and format of the vote data 507 can comply with the API so that the evaluation results can be uniformly interpreted by the central coordinator 110.

In one example, all controller modules 120 may be required to submit vote data 507 comprising ordinal information, in which each controller module 120 ranks the resource allocation proposals according to its own preferences (e.g., first choice, second choice, third choice, etc.). In such examples, the ordinal information may include a pairwise comparison between all of the available resource allocation proposals. Accordingly, the ordinal information may include multiple indications of preference for one or the other or neither of each pair of resource allocation proposals.

In another example, the controller modules 120 may be required to generate vote data 507 comprising cardinal information in which each controller module 120 scores the resource allocation proposals according to how compatible proposals are with its internal policies and objectives (e.g., weighted votes assigned to each choice, where all modules have the same total weight to assign across all choices). In other examples, the central coordinator 110 can receive a mix of ordinal and cardinal vote data 507. Examples of vote data 507 are described in more detail in reference to FIG. 7 herein.

The central coordinator 110 can analyze the vote data 507 to determine the results of the vote and select a winning resource allocation proposal in accordance therewith. In various examples, the central coordinator 110 can apply various election theory mechanisms to evaluate the vote data 507 to determine a winning resource allocation proposal. The winning resource allocation proposal can then be used to generate and send the vote result (e.g., winner) resource allocation proposal 508 (reference 8) to the SDN controller 130. Accordingly, the vote result resource allocation proposal 508 can include an indication, such as a resource allocation proposal identifier for the winning resource allocation proposal information according to the vote. The SDN controller 130 can then generate and send a topology configuration command(s) 509 (reference 9) to configure the SDN network 160 according to the winning resource allocation proposal.

Figure 6:
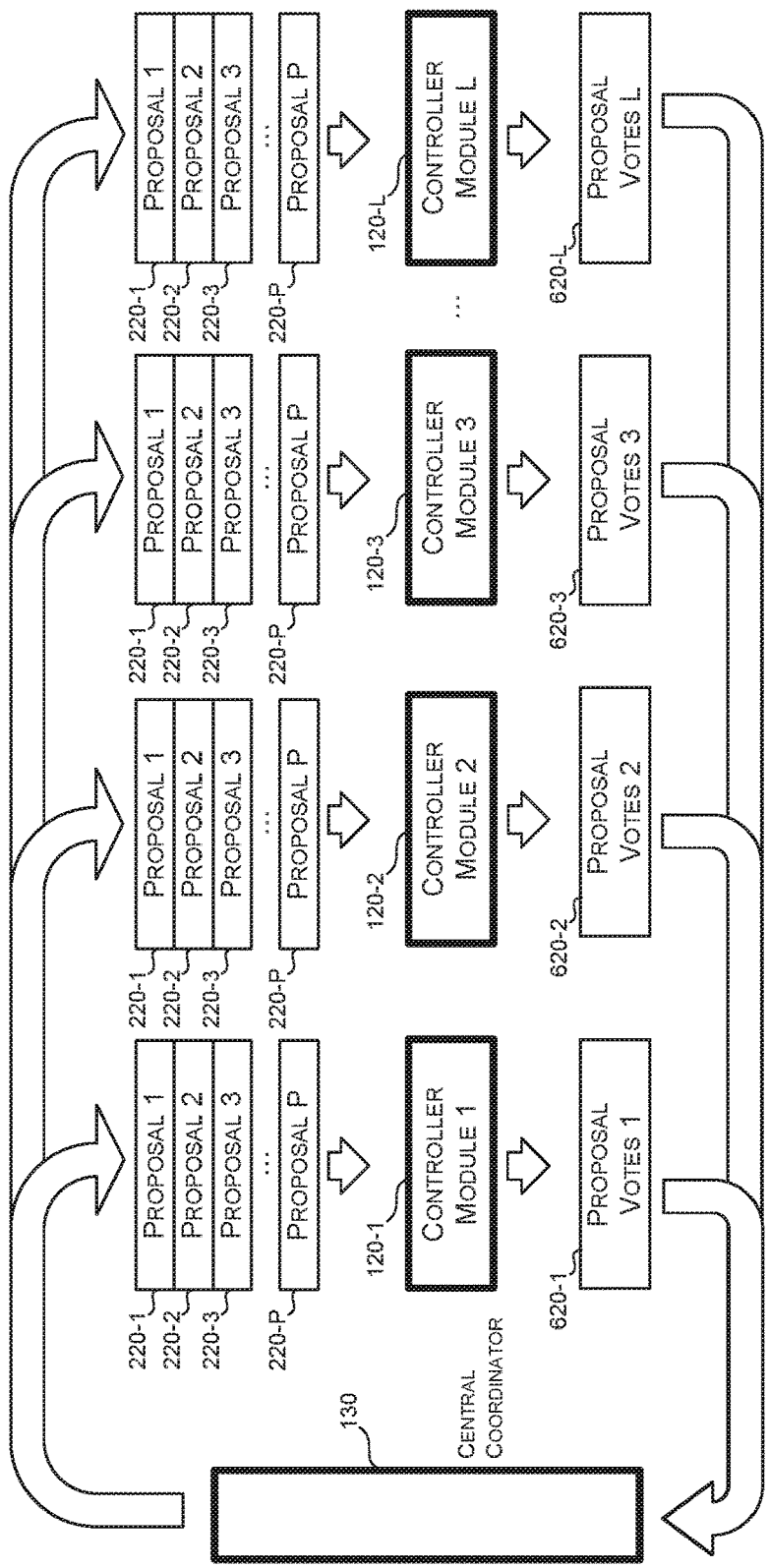
FIG. 6 illustrates a dataflow for independent controller module evaluation of multiple resource allocation proposals, according to various examples.

FIG. 6 illustrates the distribution of available resource allocation proposals 220 and the collection of resource allocation proposal votes 620, according to various examples of the present disclosure. As illustrated, the central coordinator 130 can send some or all of the P resource allocation proposals 220 to the L controller modules 120, where P and L are natural numbers. As described herein, each of the controller modules 120 can analyze the resource allocation proposals 220 to determine resource allocation proposal votes 620 that can include an indication of a preference for one or more of the resource allocation proposals 220.

Figure 7:
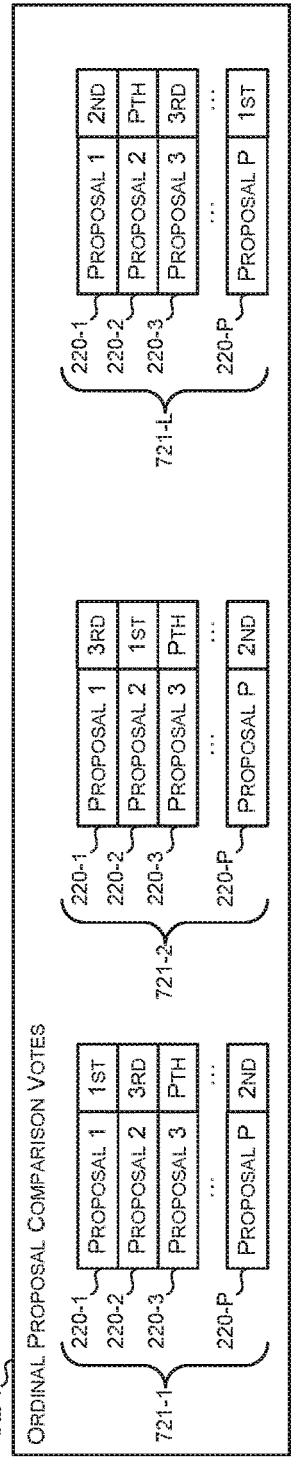
FIG. 7 illustrates an example of independent, comparison based evaluations of multiple resource allocation proposals.
Figure 7:
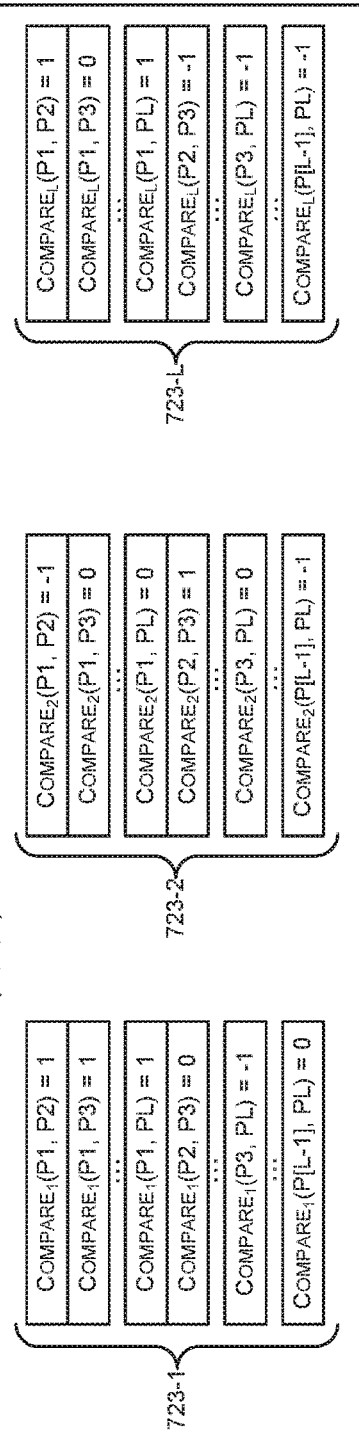

Two example formats of resource allocation proposal votes are illustrated in FIG. 7. In one example, the resource allocation proposal votes 620 can include ordinal proposal comparison votes 621. The ordinal proposal comparison votes 621 can include listings 721 of the available resource allocation proposals ranked by their ordinal preference. As shown in FIG. 7, each listing 721 can correspond to a source controller module 120. Accordingly, the ordinal proposal comparison vote 621 can include as many listings 721 as participating controller modules 120.

In another example, the resource allocation proposal votes 620 can include pairwise proposal comparison votes 623. As illustrated, the pain/vise proposal comparison votes 623 can include multiple sets of pairwise comparisons 723 between each pair of available resource allocation proposals. In such pairwise proposal comparisons, the preference for one or the other or neither of the pair of resource allocation proposals may be indicated by a numeric value. In the example shown in FIG. 7, each pairwise comparison 723 indicates a preference of 1, 0, or −1. An indication of 1 indicates that the corresponding controller module 120 prefers the first input resource allocation proposal over the second input resource allocation proposal and a comparison function in which two resource allocation proposals are used as input. More specifically, a compare(proposal_1, proposal_ 2) function implemented by a specific controller module 120 can output a preference for the two proposals by returning one of three outputs where: a first indicator (e.g., "1") indicates a preference for proposal_1, a second indicator (e.g., "−1") indicates a preference for proposal_2, while a third indicator (e.g., "0") indicates no preference between proposal_1 or proposal_2.

Figure 8:
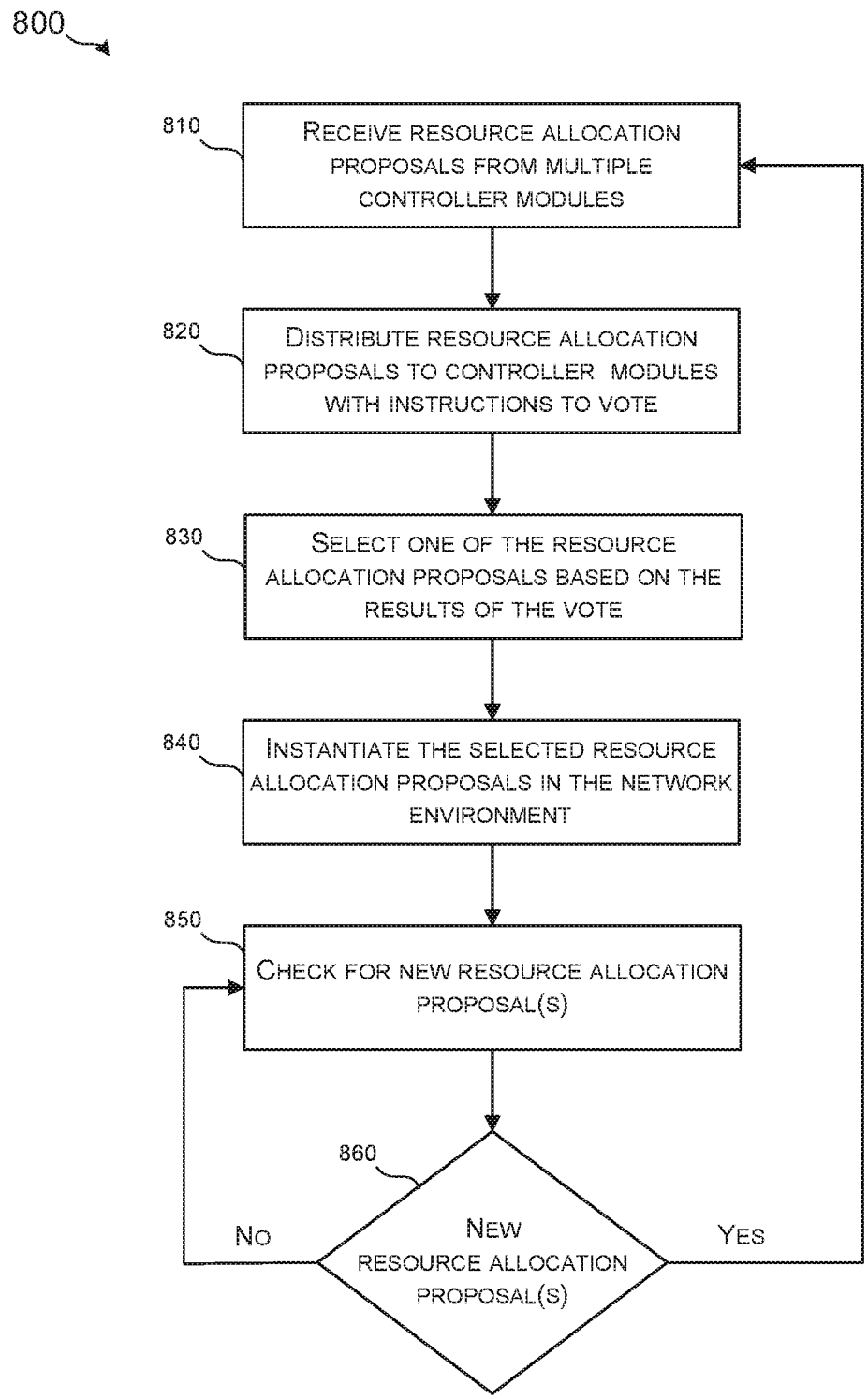
FIG. 8 is a flowchart of a method for selecting a resource allocation proposal from multiple resource allocation proposals, according to various examples.

FIG. 8 depicts a flowchart of a method 800 according to various examples of the present disclosure for selecting a resource allocation proposal and/or a resulting topology in an SDN network 160. While the method 800 is described as being performed by the central coordinator 110 of the system 100, it is possible for any component in system 100, shown or not shown, to implement the method to select and/or instantiate a resource allocation proposal. For instance, the SDN controller 130 may include some or all of the functionality of the central coordinator 110 described herein.

As shown, method 800 can begin at box 810, in which the central coordinator 110 can receive resource allocation proposals from multiple controller modules 120. In such examples, the controller modules 120 can synchronously or asynchronously send the resource allocation proposals to the central coordinator 110 whenever they determine that a new allocation may be useful to its users.

The resource allocation proposals can be received as electronic messages formatted according to an API associated with the central coordinator 110 and include information that defines an allocation of networking and computing resources. For instance, some or all of the resource allocation proposals may include specifications for networking resources, such as OpenFlow Table entries, rate limiters, queues, and the like. Similarly, some or all of the resource allocation proposals can include specifications for computing resources, such as reservations of VM slots, identification of server CPUs, link bandwidth, and the like. In some examples, the resource allocation proposals can include a definition that defines a particular configuration of the network topology. As used herein, the term topology when used in reference to the SDN network refers to the specification of hardware and links included in the network. For example, the topology may include specifications for switches 140, computing resources 150, the links that connect them, and the like.

At box 820, the central coordinator 110 can send or otherwise publish some or all of the available (e.g., recently and/or previously received) resource allocation proposals to some or all of controller modules 120 connected to or active in the system 100. In some examples, the central coordinator 110 may also send instructions to the controller module 120 to analyze the available proposals and to generate a vote according to the modules' own internal analysis. The format and type of votes to be generated may be in accordance with an API associated with the central coordinator 110.

At box 830, the central coordinator 110 can select one of the resource allocation proposals based on the results of the votes. In some examples, the results of the votes can be analyzed by the central coordinator 110 based on various criteria or election mechanisms. Such criteria and election mechanisms are described in more detail below.

At box 840, the central coordinator 110 can instantiate, or instruct one of the controller modules to instantiate the selected resource allocation proposals in the network 160. To instantiate the selected resource allocation proposal, the central coordinator 110 or one of the controller modules 120 can send a command to an intermediary, such as SDN controller 130, to configure the network 160 in accordance with the resource allocation proposal.

At determination box 850, the central coordinator 110 can enter a while loop during which it checks for new resource allocation proposals from controller modules 120. If central coordinator 110 determines there are no new proposals at determination box 860, then the central coordinator 110 continues to check for new resource allocation proposals at box 850. If the central coordinator 110 determines there are new resource allocation proposals at box 860, then it can repeat boxes 810 through 850 to select and instantiate a resource allocation proposal.

As part of method 800, the central coordinator 110 can resolve conflicts among controller modules 120 by selecting a single resource allocation proposal with which to configure the SDN network that delivers the most value to as many of the controller modules as possible in box 830. However, the value of a particular implementation of a particular resource allocation proposal in the SDN network 160 may be difficult to measure or assess accurately and consistently across controller modules 120. As used herein the term "precision" refers to how accurately a resource allocation proposal can be evaluated and the term "parity" refers to how consistent that evaluation (e.g., using the same or similar evaluation metric) is across controller modules 120.

When analyzing the resource allocation vote data 507, the central coordinator 110 can consider both precision and parity of the manner in which each controller module 120 generates its corresponding vote data 507. In terms of the analysis that a controller module 120 performs to generate its vote data, the level of precision indicates how accurately that controller module can discern its space of allocation alternatives. For example, a so-called fault tolerance controller module (FTM) can use and translate different levels of a worse case survivability metric (WCS). For example, if evaluate(P1)=2x[evaluate(P2)], then the allocation represented by resource allocation proposal P1 has twice the survivability rating as resource allocation proposal P2. More specifically, a controller module 120 can provide a cardinal rank that accurately reflects the magnitude of one option over another. A lack of precision occurs when preferences are not tied to metrics, such as when a controller module 120 must trade-off multiple resource types or binary decisions (e.g., firewall rules). Even when preferences are tied to metrics, the metrics may not accurately express the actual value of alternative proposals. For example, a core-bandwidth module may prefer a resource allocation proposal that reserves 15% of the core bandwidth over a resource allocation proposal that reserves 18% of the core bandwidth, however the actual value to a user is unlikely to be linearly proportional to the bandwidth percentages and accurately assessing the actual values for different users can be challenging.

Parity across controller modules 120 means that evaluation of the resource allocation proposals performed by the controller modules 120 is analogous. This means that the relative rankings of resource allocation proposals are known or can be automatically constrained to be normalized across modules. In one example, all controller modules 120 can express precise rankings (values) in a common currency (e.g., dollar amounts). However, parity can fail for many reasons. If a dollar amount is used as a common currency to capture economic values or costs of resource allocation proposals, it can be challenging or impractical for some controller modules 120 to accurately convert its own internal metric (e.g., WCS vs. guaranteed bandwidth, vs. unused core bandwidth) to a dollar amount. If the network operator knows only that fault tolerance is generally preferred to saving power, ranking comparison type vote data can be more effective to use when compared to ratings/values of an evaluations (metric) type vote.

Based on considerations of precision and parity, various implementations according to examples of the present disclosure are possible. In one example, all controller modules 120 can be implemented according to an API to have both precision and parity in their analysis of the resource allocation proposals. In such implementations, the central coordinator can add up the values of the votes for each proposal to determine a winning proposal. In one example, the output of an individual proposal evaluation type (e.g., evaluate(proposal_PN)) function from each module can represent currency, so the central coordinator 110 can determine a winning proposal based on the maximization of consistent currency units in aggregate.

In another example, the controller modules 120 can be implemented according to an API to have precision, but no parity in the analysis of the resource allocation proposals. In such implementations, each controller module 120 can express the relative trade-off of each resource allocation proposal accurately, but some additional analysis must be applied by the central coordinator 110 to normalize the vote data. The controller modules 120 can use cumulative or range voting, in which each controller module 120 can divide a fixed number of total votes across the available resource allocation proposals. Optionally, a weight can be assigned to each controller module 120 to express the relative importance of that module's objective.

In another example, the controller modules 120 can be implemented according to an API so that not all modules have precision. In such scenarios, the controller modules 120 may not be able to consistently evaluate the differences between the resource allocation proposals, but may instead be able to evaluate a preference between proposals. In such examples, the controller modules 120 can be implemented with a comparison type function (e.g., compare(proposal_1, proposal_2)) to output an ordered preference for the available resource allocation proposals. The collection of ordered preferences, such as the pairwise proposal comparison votes 623, can be used by central coordinator 110 to establish a global ordering using an ordinal voting procedure.

To determine the winning resource allocation proposal the central coordinator 110 can apply any of various election mechanisms. For example, the central coordinator 110 can maximize a global objective function by selecting the resource allocation proposal that yields the largest of the output of analogous evaluation type functions from multiple resource allocation modules. In another scenario, the central coordinator can maximize a set of voter ratings using a cardinal election mechanism, such as a range (e.g., cumulative) voting scheme, in which every controller module 120 can distribute its fixed number of votes to candidate resource allocation proposals. In yet another example, the central coordinator 110 can maximize a mutual majority using an ordinal voting data to determine a winner resource allocation proposal as the option that received the largest fraction of votes in a set of all-pairs elections by analyzing the output of the pairwise comparison type function. In some examples, a tie between two proposals is not counted as a win.

In some examples, the central coordinator 110 can infer cardinality from ordinal preferences. Inferring the cardinality can advantageously lower the proportion of modules needed to be precise by reducing the requirement for parity across the controller modules 120. Using the ordinal proposal comparison votes 621, the central coordinator can approximate the outputs of an evaluation type function. The approximation can be used to determine an optimized resource allocation proposal that can in some scenarios be better than a simple ordinal election mechanism. Other mechanisms, like a rating-based voting mechanism, can then be applied. Examples of these mechanisms are a range and cumulative voting mechanisms described herein.

In one example, given a set of ordered proposals: $P=\{P\_1, P\_2, \ldots P\_N\}$, where this set is organized in according to the order of preference (P_N is the most preferred), the central coordinator can approximate the "distance" between $P\_i$ and $P\_j$. using various techniques to determine the distance. For example, the central coordinator can use linear distances, pairwise wins, or averages over known distances. Given an ordered set of candidate proposals (e.g., $P=\{P1, P2, \ldots PK\}$) the central coordinator can assign a normalized point value to each resource allocation proposal such that these point values add up to some previously determined number.

One example includes the central coordinator using the output of the pairwise comparison type function from controller modules 120 to create an ordered list of resource allocation proposals. Various methods can be used to translate pairwise comparisons into an ordered list of proposals. The ordered list of proposals can then be used to "infer" or generate a cardinal ranking.

In one example, the central coordinator 110 can compare every unique pair of resource allocation proposals for at least some of the L controller modules 120: Pi,Pj, where i≠j. If the output of the comparison indicates that the corresponding controller module 120 favors Pi, then is it counted as a "win" for Pi. If the comparison indicates that the corresponding controller module 120 favors Pj, then it is counted as a win for Pj. In the event that the output of the comparison indicates that the corresponding controller module 120 is neutral in that particular comparison, then it does not count as a win for either Pi or Pj. The resource allocation proposals can then be ordered according to the increasing or decreasing number of wins. Ties can be broken with an arbitrary rule. Such arbitrary rules can be deterministic (i.e., alphabetical or earliest time submitted), or non-deterministic (i.e., random). From the order determined based on the number of wins, the central coordinator can assign K points to the ordered list $\{OP\_1, OP\_2, OP\_3, \ldots OP\_K\}$ in multiple ways (OP refers to "ordered proposal", and $OP\_K >= OP\_(K-1) >= \ldots OP\_1$).

Once the ordered lists are generated for the controller modules 120, the central coordinator 110 can generate cardinal rankings or scores for each of the resource allocation modules for the corresponding controller modules 120.

In one example, the central coordinator can use the order of preference to generate a linearly distributed ranking of the proposals. For example, for a given number R, the central coordinator 110 can solve the equation: x+2x+ . . . +Kx=R, for x. The central coordinator 110 can then define a function val(OP_i)=x*i.

In another example, the central coordinator 110 can generate cardinal rankings by assuming that the spacing of scores for the ordered list is similar to the cumulative outcome of pairwise comparisons. Using the count of wins described above, the central coordinator 110 can define the output of a function wins(OP_i) as the number of wins by proposal OP_i in pairwise comparisons and then solve wins(OP_1)*x+wins(OP_2)*x+ . . . +wins(OP_2)*x=R, for x. It can then define the function val(OP_i)=wins(OP_i)*x to generate inferred cardinal rankings for each resource allocation proposal.

The central coordinator 110 may also infer cardinal rankings for a controller module 120 that provided ordinal preferences by assuming that the coefficients of preference are the same as the average of all controller modules 120 that did express cardinal preferences. In such implementations, the central coordinator 110 can assume that the controller module 120 has a defined internal evaluation routine (e.g., evaluate(P)). The central coordinator 110 can use the corresponding ordered list of resource allocation proposals: {OP_1, . . . OP_N} to solve the equation: evaluate(OP_1)*x+evaluate(OP_2)*x+ . . . +evaluate(OP_K)*x=R, for x.

In this previous example, the inferred cardinal ranking may be seen as weights on ordinal ranking of the resource allocation proposals for a given controller module 120. The central coordinator 110 can determine the average of the weights across all controller modules to generate weights w_1, w_2, . . . w_N that can be used to solve the equation: w_1*x+w_2*x+ . . . w_K*x=R, for x. The function val (OP_i)=x*w_i can then be defined and used to determine the corresponding cardinal rankings. Accordingly, the average weights for all controller modules 120 with a priori known cardinal rankings can be used as the weights for every other module in the system for which we only have ordinal preferences. Examples that can infer cardinal rankings from ordinal rankings can advantageously increase the quality and sophistications of conflict resolution, but only require the less complex ordinal preference information from the controller modules 120.

According to the foregoing, examples disclosed herein enable network operator to implement an SDN network using multiple controller modules that may have disparate policies and objectives regarding the configuration of the topology of the SDN network. Conflicts between the policies and objectives, as represented by the differences in the resource allocation proposals, can be resolved using various election based decision mechanisms, thus allowing the network operator to realize the benefits of the policies and objectives of multiple independent controller modules.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

What is claimed is:

1. A method for allocating network resources comprising:
   receiving, by a software-defined networking (SDN) controller, a plurality of resource allocation proposals from a plurality of controller modules, wherein the plurality of resource allocation proposals comprises definitions of topologies in a computer networking environment, wherein the SDN controller utilizes the resource allocation proposals to allocate resources to the computer networking environment;
   instructing the controller modules to generate votes for the plurality of resource allocation proposals, wherein each controller module of the plurality of controller modules controls an independent resource allocation of the computer networking environment;
   selecting one of the plurality of resource allocation proposals based on the votes; and
   configuring, by the SDN controller, the computer networking environment in accordance with the selected one of the plurality of resource allocation proposals.

2. The method of claim 1, wherein the votes comprise ordinal rankings of the plurality of resource allocation proposals.

3. The method of claim 1, wherein the votes comprise pairwise comparisons of the plurality of resource allocation proposals.

4. The method of claim 3, wherein each of the pairwise comparisons comprises corresponding indications of preference for a first resource allocation proposal over a second resource allocation proposal or no preference.

5. The method of claim 4, wherein selecting the one of the plurality resource allocation proposals comprises generating weights for the plurality of resource allocation proposals based on the corresponding indications of preference.

6. The method of claim 1, further comprising instructing one of the plurality of controller modules to instantiate the selected one of the plurality of resource allocation proposals in the computer networking environment.

7. The method of claim 1, wherein the selecting the one of the plurality of resource allocation proposals comprises inferring evaluation metrics used by at least one of the plurality of controller modules to generate the votes.

8. A system comprising:
   a computer processor including a memory device comprising instructions that when executed by the computer processor cause the computer processor to:
      generate, by a plurality of controller modules, a plurality of resource allocation proposals comprising definitions of topologies in a computer networking environment, the plurality of controller modules connected to a central coordinator module;
      receive, by the central coordinator, the plurality of resource allocation proposals from the plurality of controller modules, wherein each controller module of the plurality of controller modules controls an independent resource allocation of the computer networking environment;
      send, by the central coordinator, the plurality of resource allocation proposals to the plurality of controller modules;
      instruct, by the central coordinator, the plurality of controller modules to generate votes for the plurality of resource allocation proposals;
      select, by the central coordinator, one of the plurality of resource allocation proposals based on the votes; and
      configure, by the central coordinator, the computer networking environment in accordance with the one of the plurality of resource allocation proposals.

9. The system of claim 8, wherein the resource allocation proposals further comprise assignments of computing resources to the plurality of controller modules.

10. The system of claim 8, wherein the votes for the plurality of resource allocation proposals comprise a single comparison format associated with the central coordinator module.

11. The system of claim 8, wherein the central coordinator module instructs each of the plurality of controller modules to generate the votes in accordance with controller module-specific criteria.

12. The system of claim 8, wherein the votes comprise ordinal rankings of the plurality of resource allocation proposals.

13. A non-transitory computer readable medium comprising instructions that when executed by a computer processor cause the computer processor to:

generate, by a plurality of controller modules, a resource allocation proposal comprising a definition of a topology in a computer networking environment in accordance with a programming interface associated with a central coordinator module in the computer networking environment, wherein each controller module of the plurality of controller modules controls an independent resource allocation of the computer networking environment;

compare, by the central coordinator module, the resource allocation proposal and a plurality of other resource allocation proposals; and allocate resources to the computer networking environment, by a software-defined networking (SDN) controller, wherein the SDN controller utilizes the resource allocation proposals to allocate resources.

14. The non-transitory computer readable medium of claim 13, wherein the instructions that cause the computer processor to compare the resource allocation proposal and the plurality of other resource allocation proposals further cause the computer processor to generate corresponding ordinal rankings.

15. The non-transitory computer readable medium of claim 13, wherein each of the corresponding ordinal rankings comprises an indication of a preference for a first resource allocation proposal over a second resource allocation proposal or no preference.

* * * * *